Figure 1:
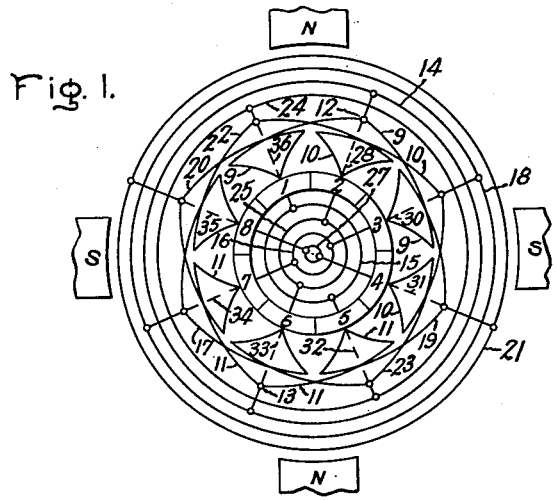

March 17, 1953      M. J. BALDWIN      2,632,125
DYNAMOELECTRIC MACHINE ARMATURE MEMBER
Filed June 2, 1952      2 SHEETS—SHEET 1

Inventor:
Morris J. Baldwin,
by *Powell F. Mack*
His Attorney.

March 17, 1953 M. J. BALDWIN 2,632,125
DYNAMOELECTRIC MACHINE ARMATURE MEMBER
Filed June 2, 1952 2 SHEETS—SHEET 2

Inventor:
Morris J. Baldwin,
by *Crancell P. Mark*
His Attorney.

Patented Mar. 17, 1953

2,632,125

UNITED STATES PATENT OFFICE 2,632,125

DYNAMOELECTRIC MACHINE ARMATURE MEMBER

Morris J. Baldwin, Erie, Pa., assignor to General Electric Company, a corporation of New York Application June 2, 1952, Serial No. 291,259

9 Claims. (Cl. 310—204)

This invention relates to armatures for commutator type dynamoelectric machines and more particularly to armatures having front-to-back equalizer connections.

There are two types of armature windings for commutator type dynamoelectric machines, the first being known as the lap winding and the other being known as the wave winding.

In the simplest form of lap winding having one coil per slot, the ends of a single armature coil are connected to adjacent commutator bars, i. e., a coil starting with a first commutator bar will proceed through a first armature core slot to the back side of the armature and then return through another slot, for example, the fifth slot, to the second commutator bar. The next winding coil would then start with the second bar, proceed through the second slot and return through the sixth slot terminating in the third commutator bar. The wave winding in its simplest form is formed by connecting the ends of a simple armature coil to commutator bars approximately two pole pitches apart. For example, assuming a four-pole machine having 19 armature core slots and 19 commutator bars, the wave winding would start with the first bar, proceed through the first slot, returning through the sixth slot, and terminate at the eleventh bar. The winding would then proceed through the eleventh slot and back through the 16th slot, terminating at the second bar. Another coil would start at the second bar, proceeding through the second slot, returning through the seventh slot for connection to the 12th bar, and so on. Both the lap winding and the wave winding are referred to as simplex windings when they close upon themselves, i. e., when the winding terminates at the same commutator bar at which it starts, and when it occupies all of the armature slots and is connected to all of the commutator bars.

In order to increase the capacity of the machine, two or more winding paths in parallel are provided, i. e., two or more simplex windings are placed on the same armature. This is referred to as a multiplex winding. For example, assume an armature having 100 core slots and 100 commutator bars, a simplex lap winding would be placed on the armature by using 50 alternate core slots and 50 alternate commutator bars, this winding closing upon itself. A second simplex lap winding exactly like the first would be placed in the remaining 50 slots and connected to the remaining commutator bars. A multiplex wave winding is constructed in exactly the same way.

Considering a duplex lap winding, i. e., a multiplex lap winding having two parallel simplex lap windings wound on the same armature, a simple coil of the first winding is connected to alternate bars, for example, bars 1 and 3, while a simple coil of the second winding is also connected to alternate bars one of which is interspaced between the bars to which the first winding is connected, for example, bars 2 and 4. It will be readily seen that, in the ideal armature, the voltage appearing at the back end of the first coil should be equal to the voltage appearing at the initial bar to which the second coil is connected, i. e., bar 2. However, many factors in actual practice combine to produce unequal voltages at these two points. Unequal induced voltages in the windings will cause circulating currents through the windings and through the brushes, which cause unnecessary heating of the coils and brushes, tending to produce poor commutation and reducing the overall efficiency of the machine. In order to assure, therefore, that the voltages at the back side of the coils of the first winding are equal to the voltages appearing at the intermediate commutator bars to which the second winding coils are connected, front-to-back equalizer connections are employed. This equalizer connects the back end of each coil, i. e., the end remote from the commutator, to the commutator bar intermediate the bars to which the coil is connected, thereby substantially reducing circulating currents in the armature to increase the overall output and improve commutation. These equalizer connections are taken through the center of the armature where they will not cut flux so that extraneous voltages are not generated therein.

It will be readily seen that if front-to-back equalizers only are employed in a multiplex lap wound machine, there will be one equalizer connection for each armature coil, thereby resulting in a large number of equalizers passing through the center of the armature. To reduce the number of front-to-back equalizers, front equalizers and back equalizers may also be employed. These equalizers are primarily used since equal voltages are not induced in the various parallel paths of a lap winding, and thus further equalization may be necessary in order to eliminate undesirable circulating currents. These front equalizers and back equalizers connect points on the armature windings two poles apart, which should theoretically be at the same potential. For example, the front equalizer connection would connect a commutator bar to which one coil is connected, and a corresponding bar to which another coil is connected two poles removed from the first coil. Similarly, the back equalizers connect the back end of a first coil and the back end of the coil two poles removed from the first coil. It will be seen that front-to-back equalizers already connect the back ends of these two coils to the commutator bars intermediate the bars to which the coils are connected, and that front equalizer connections will connect these two bars. It will therefore be seen that one of the front-to-back equalizer connections may be eliminated and thus in the case of a four pole multiplex lap winding having front and back equalizers, only half as many front-to-back equalizers need be utilized. Front and back equalizers are not used in armatures having wave windings, however, the same reason exists for the use of front-to-back equalizers.

Many commutator-type dynamoelectric machines have been constructed in the past utilizing front-to-back equalizers. These machines have been in the larger sizes, having the armature core mounted on a spider with the front-to-back equalizer connections passing through the open spaces in the spider from the front of the armature to the back. In this way, the front-to-back equalizer connections do not cut any of the flux passing through the armature and therefore no extraneous voltages are generated therein. In smaller machines, for example, traction motors, the armatures are relatively small and are mounted directly upon a large shaft, so that it is difficult at best to get the front-to-back equalizer connection far enough down to remove it from the flux-carrying region. It is therefore desirable to provide a commutator-type dynamoelectric machine armature having front-to-back equalizer connections wherein the connections can be passed through the armature core without the generation of extraneous voltages therein.

Therefore, an object of this invention is to provide an improved commutator-type dynamoelectric machine armature construction having front-to-back equalizer connections wherein the equalizer connections are arranged so that no extraneous voltages are generated therein.

Further objects and advantages of this invention will become apparent and the invention will be better understood by reference to the following description and accompanying drawing, and the features of novelty which characterize this invention will be pointed out with particularity in the claims annexed to and forming a part of this specification.

This invention, in its broadest aspects, contemplates a commutator type dynamoelectric machine having its armature mounted on the shaft. An armature winding is arranged in the core slots of the armature and is provided with front-to-back equalizer connections. These equalizer connections are spiralled through the core and about the shaft so that voltages generated therein are cancelled. More specifically, the front-to-back equalizer connections are spiralled about the shaft through a multiple of 360 electrical degrees in order completely to cancel any voltages which may be generated in the equalizer connections. In order to provide the spiral arrangement of the front-to-back equalizers, spiral passages may be formed in the core through which the equalizer connections pass, or in the alternative, the core may be mounted upon a sleeve, which in turn is mounted on the shaft, the sleeve having spiral grooves formed in its outer periphery, thus defining spiral passages with the wall of the bore of the armature core with the equalizer connections being arranged in the passages. Another alternative construction provides spiral grooves broached in the wall of the bore of the armature core, these grooves likewise defining spiral passages when the core is mounted on the shaft and the front-to-back equalizer connections are again arranged in these passages. It is thus seen that by arranging the front-to-back equalizer connections in a uniform spiral of 360 electrical degrees or a multiple thereof, it is possible to cancel out the various induced voltages that will be generated along the spiral so that no net generator voltage is applied to points of connection.

Figure 2:
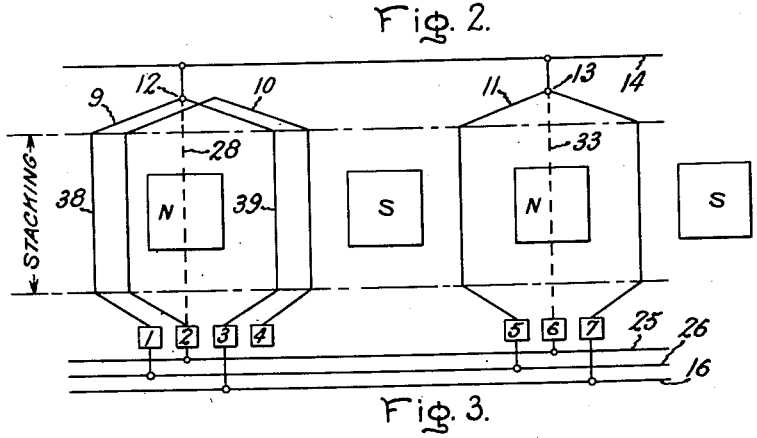
Figure 3:
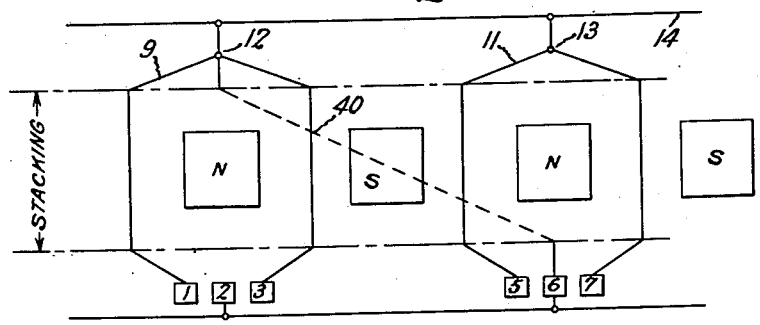
Figure 4:
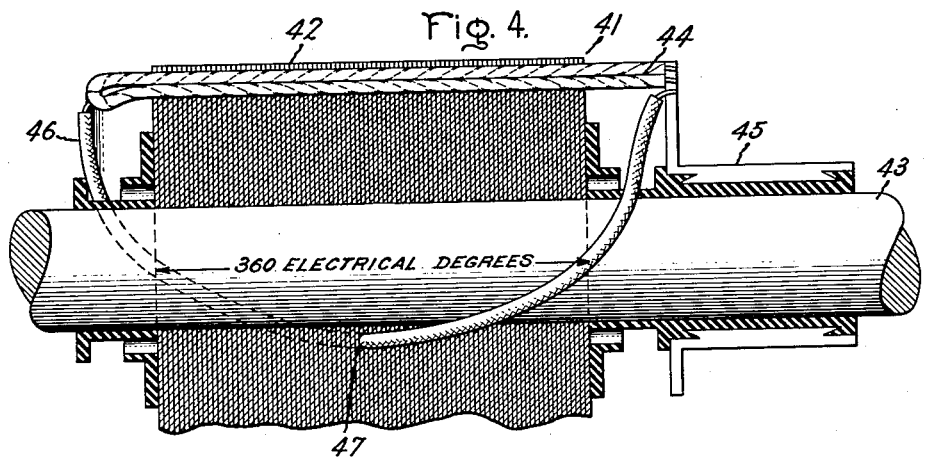
Figure 5:
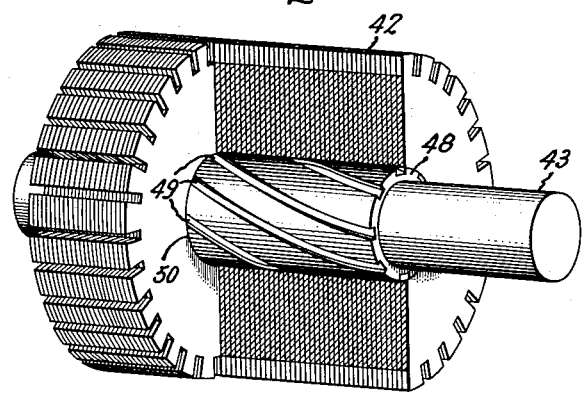
Figure 6:
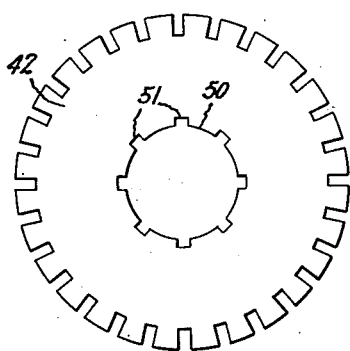

In the drawing, Figs. 1 and 2 are schematic illustrations showing a lap wound armature provided with front-to-back, front, and back equalizer connections, these figures being used for explanatory purposes. Fig. 3 is another schematic illustration showing a spiral front-to-back equalizer connection, Fig. 4 is a side elevational view, partly in section, illustrating an armature having a spiral front-to-back equalizer connection; Fig. 5 is a view in perspective, partially broken away, showing an armature provided with another means of spiraling the front-to-back equalizer connections; and Fig. 6 is an end view of an armature core with yet another means of spiraling the front-to-back equalizer connections.

Referring now to Fig. 1, there is schematically shown an armature having commutator bars 1 to 8 and having a multiplex lap winding. It will be seen that coil 9 starts at bar 1 and terminates at bar 3, with coil 10 starting at bar 2 and terminating at 4, and so on. Since this is shown as being a four-pole machine, it will be understood that coil 9 and coil 11 will theoretically have the same potential generated therein. To insure that the potentials in these two coils are actually equal and in order to prevent circulating currents, the back end 12 of coil 9 and 13 of coil 11 are connected by a back equalizer 14, with bars 1 and 5 being connected by front equalizer 15, and bars 3 and 7 also being connected by front equalizer 16. It will also be readily seen that the back sides of the remaining coils which are spaced two poles apart are connected by back equalizers, for example, the back side of coil 10 is connected to the back side of coil 17 by back equalizer 18, the back side of coil 19 is connected to the back side of coil 20 by back equalizer 21, and the back side of coil 22 is connected to the back side of coil 23 by back equalizer 24. Likewise, commutator bars 2 and 6 are connected by front equalizer 25, bars 1 and 5 are connected by front equalizer 15, and bars 4 and 8 are connected by front equalizer 27.

As pointed out above, it is desirable also to connect the back end of each coil to the commutator bar intermediate the bars to which the coil is connected, and thus it is seen that the back end 12 of coil 9 is connected to commutator bar 2 by front-to-back equalizer connection 28, and the back ends of coils 10, 19, 23, 11, 17, 20 and 22 are respectively connected to bars 3, 4, 5, 6, 7, 8 and 1 by front-to-back equalizer connections 30, 31, 32, 33, 34, 35 and 36.

Referring now to Fig. 2, there is shown a developed presentation of the armature of Fig. 1, and it is again seen that coil 9 is connected to bars 1 and 3, and coil 10 is connected to bars 2 and 4. Coil 11 spaced two poles from coil 9 is connected to bars 5 and 7. It will be readily seen that the voltages generated in coils 9 and 11 should be theoretically equal. However, this in actual practice is not the case since equal fluxes are not produced by the respective poles because of unequal reluctances in the magnetic circuit. Thus, differences in air gap, inaccuracies in the alignment of the shaft, impurities in the magnetic material in the core, etc. may alter the reluctance of some parts of the magnetic circuit and thus produce unequal fluxes in the poles. In the event that the voltages generated in coils 9 and 11 are not equal, the unequal induced voltages will cause circulating currents in the windings and through the brushes, causing unnecessary heating and tending to produce poor commutation. In order to assure that the voltages generated in coils 9 and 11 are equal, the back ends 12 of coil 9 and 13 of coil 11 are connected by a back equalizer connection 14, it being readily understood that the back ends of the remaining coils in the winding will be similarly connected to the back ends of their corresponding coils two poles removed therefrom.

Front equalizer connections are also provided with front equalizer 26 connecting bars 1 and 5, and equalizer 25 connecting bars 2 and 6, and front equalizer 16 connection bars 3 and 7. It will also be readily understood that the remaining bars will be similarly connected. It will now be seen that the voltages generated in corresponding coils two poles removed should be equal by virtue of the front and back equalizer connections shown. There is another requirement, however, and that is that the voltage appearing at bar 2 should be equal to the voltage appearing at back end 12 of coil 9. This can be readily explained since it is seen that the voltage appearing at bar 1 plus the voltage generated in coil side 38 of coil 9 equals the voltage at back end 12 of coil 9, and the voltage at back end 12 plus the voltage generated in coil side 39 equals the voltage on bar 3, which is also equal to the voltage generated in coil sides 38 and 39. In order to maintain balance in the winding and to prevent circulating currents, it is necessary that the voltage on bar 2 be equal to half the sum of the voltages generated in coil sides 38 and 39, or equal to the voltage appearing at back end 12.

In order to assure that this condition exists, front-to-back equalizer 28 connects back end 12 of coil 9 to bar 2, and it will be readily seen that while this equalizer connection may carry transient currents due to commutation, it will carry no current continuously and thus need not be a heavy conductor. Likewise, back end 13 of coil 11, corresponding to coil 9, and two poles removed therefrom, is connected to brush 6 by front-to-back equalizer 33. It will be readily seen that by virtue of the provision of the back equalizer 14 and the front equalizer 26, one of the two front-to-back equalizers 28 or 33 may be eliminated. However, they are here shown for purposes of explanation. In conventional armature constructions for large capacity machines, the front-to-back equalizers are carried through the center of the armature, the core of which is usually mounted upon a large spider. Thus, these front-to-back equalizer connections do not cut any of the flux traversing the armature core, and no extraneous voltages are generated therein.

In the case of small motors, however, for example, traction motors used on locomotives, the armature core is relatively small and is not mounted upon a spider, but is rather mounted directly upon a large shaft. It is therefore difficult to get the front-to-back equalizer connections far enough down toward the center of the armature to be out of the flux-carrying zone. In order to prevent the front-to-back equalizer connections from generating voltages by cutting the flux traversing the armature, the front-to-back equalizer may be spiralled so that the voltages generated therein are cancelled. Referring to Fig. 3, it is seen that a single front-to-back equalizer 40 has been substituted for the two equalizers 28 and 33 of Fig. 2, and that this equalizer has been spiralled through 360 electrical degrees in the connecting back equalizer 14 and front equalizer 25, with the spiral being 360 electrical degrees. Referring to Fig. 4, there is shown an armature 41 having a core 42 formed of a plurality of relatively thin laminations of magnetic material mounted on a suitable shaft 43. An armature winding 44, either of the wave type or the lap type, is arranged in suitable slots in the core 42 and is suitably connected to commutator 45. The winding 44 is provided with suitable front-to-back equalizer connections 46 arranged in suitable spiral passages 47 formed in the core 42 adjacent the shaft 43. As pointed out above, the portion of the equalizer 46 which passes through the core should preferably have a uniform spiral about the shaft 43 of any multiple of 360 electrical degrees. In the machine of Fig. 4, which is a four-pole machine, a 360 electrical degree spiral takes the equalizer 46, 180 mechanical degrees about the shaft 43. It is thus seen that by entering the stacking of the core at a point 360 electrical degrees away from the point at which the front-to-back equalizer leaves the stacking at the opposite end of the core, the voltages induced in the equalizer connection will be substantially cancelled.

Referring to Fig. 5, there is shown another arrangement for securing a spiral front-to-back equalizer connection. Here, the core 42 is mounted upon a suitable sleeve member 48 which in turn is mounted on the shaft 43. A plurality of spiral grooves 49 are machined in the outer periphery of the sleeve 48 and these grooves define spiral passages with the wall of the bore 50 of the core 42 in which the equalizers 46 are arranged.

Referring now to Fig. 6, there is shown another alternative form of construction in which spiral grooves 51 are broached or otherwise formed in the wall of the bore 50 of the armature core 42. These grooves thus define the spiral passages with the shaft 43 and the equalizers 46 are arranged therein. It will also be readily seen that the spiral grooves may be machined in the shaft itself.

It will now be readily apparent that this invention provides a machine incorporating front-to-back equalizers, with the equalizers being spiralled, thereby to cancel any voltages induced therein. This invention thus permits the use of front-to-back equalizers in commutator type dynamo-electric machines, in which the armature core is mounted directly upon the shaft.

While I have shown and described specific embodiments of this invention, further modifications and improvements will occur to those skilled in the art. I desire it to be understood, therefore, that this invention is not limited to the forms shown, and I intend in the appended claims to cover all modifications which do not depart from the true spirit and scope of this invention.

What I claim as new and desire to secure by Letters Patent of the United States is:

1. In a commutator-type dynamoelectric machine, an armature mounted on a shaft and having an armature winding with a front-to-back equalizer connection, said equalizer connection being spiraled about said shaft thereby to cancel voltages generated therein.

2. In a commutator-type dynamoelectric machine, an armature having a core mounted on a shaft with winding slots formed in the outer periphery thereof, and an armature winding having conductors arranged in said slots and having a front-to-back equalizer connection, said core having a passage formed therein spiraled about said shaft, said equalizer connection passing through said passage thereby to cancel voltages generated therein.

3. In a commutator-type dynamoelectric machine, an armature having a core mounted on a shaft with winding slots formed in the outer periphery thereof, and an armature winding having conductors arranged in said slots and having a front-to-back equalizer connection, said core having a passage formed therein spiraled through a multiple of 360 electrical degrees about said shaft, said equalizer connection passing through said passage thereby to cancel voltages generated therein.

4. In a commutator-type dynamoelectric machine, an armature having a core mounted on a shaft with winding slots formed in the outer periphery thereof, and an armature winding having conductors arranged in said slots and having a front-to-back equalizer connection, said core having a passage formed therein spiraled about said shaft and adjacent thereto, said equalizer connection passing through said passage thereby to cancel voltages generated therein.

5. In a commutator-type dynamoelectric machine, an armature mounted on a shaft and having an armature winding with a front-to-back equalizer connection, said equalizer connection being spiraled through a multiple of 360 electrical degrees about said shaft thereby to cancel voltages generated therein.

6. In a commutator-type dynamoelectric machine, an armature having a core with winding slots formed in the outer periphery thereof and with a central bore formed therein, an armature winding having conductors arranged in said slots and having a front-to-back equalizer connection, and a sleeve member arranged in said core bore adapted to be mounted on a shaft and having a spiral groove formed in the outer periphery thereof defining a spiral passage with the wall of said core bore, said equalizer connection being arranged in said passage thereby to cancel voltages generated therein.

7. In a commutator-type dynamoelectric machine, an armature having a core with winding slots formed in the outer periphery thereof and with a central bore formed therein, an armature winding having conductors arranged in said slots and having a front-to-back equalizer connection, and a sleeve member arranged in said core bore adapted to be mounted on a shaft and having a groove formed in the outer periphery thereof spiraled through a multiple of 360 degrees and defining a spiral passage with the wall of said core bore, said equalizer connection being arranged in said passage thereby to cancel voltages generated therein.

8. In a commutator-type dynamoelectric machine, an armature having a core with winding slots formed in the outer periphery thereof and with a central bore formed therein, an armature winding having conductors arranged in said slots and having a front-to-back equalizer connection, the wall of said bore having a spiral groove formed therein, a shaft mounted in said core bore defining a spiral passage with said groove, said equalizer connection being arranged in said passage thereby to cancel voltages generated therein.

9. In a commutator-type dynamoelectric machine, an armature having a core with winding slots formed in the outer periphery thereof and with a central bore formed therein, an armature winding having conductors arranged in said slots and having a front-to-back equalizer connection, the wall of said bore having a groove formed therein spiraled through a multiple of 360 electrical degrees, a shaft mounted in said core bore defining a spiral passage with said groove, said equalizer connection being arranged in said passage thereby to cancel voltages generated therein.

MORRIS J. BALDWIN.

No references cited.